Dec. 21, 1965  T. D. BAILEY  3,224,704
POWER TAKE-OFF DRUM FOR VEHICLES
Filed March 23, 1964  2 Sheets-Sheet 1

*INVENTOR.*
TODD D. BAILEY
BY
*Gordon Wood.*
ATTORNEY

Dec. 21, 1965 T. D. BAILEY 3,224,704

POWER TAKE-OFF DRUM FOR VEHICLES

Filed March 23, 1964 2 Sheets-Sheet 2

INVENTOR.
TODD D. BAILEY
BY Gordon Wood.
ATTORNEY

United States Patent Office 3,224,704
Patented Dec. 21, 1965

3,224,704
POWER TAKE-OFF DRUM FOR VEHICLES
Todd D. Bailey, 2767 Olive Highway, Oroville, Calif.
Filed Mar. 23, 1964, Ser. No. 353,904
5 Claims. (Cl. 242—95)

This invention relates to a power take-off of the type that comprises a drum adapted to be secured to one of the power driven wheels of a vehicle and is similar in many respects to that shown in by copending patent application Serial No. 214,341 filed August 2, 1962, now Patent No. 3,160,364.

The main object of the present invention is the provision of a power take-off drum that is adapted to be secured in a very speedy manner to one of the driven wheels of an automobile so as to permit the drum to be employed as a winch or for driving a belt or for any other purpose in which the power of the automobile is to be employed. The present invention is an improvement over the drum shown in the copending application above noted in that the instant invention may be applied much more quickly and with greater facility than that shown in the pending application and in the prior art.

Another object of the invention is the provision of a power take-off drum that is adapted to be secured to a wheel of a vehicle in such a manner that there is no danger of losing any of the parts during the installation of the drum.

Still another object of the invention is the provision of a power take-off drum which may be installed very quickly and secured to the wheel of the automobile in a much more efficient manner than has been possible heretofore.

Other objects and advantages will be seen from the following specification and from the drawings in which.

Figure 1:
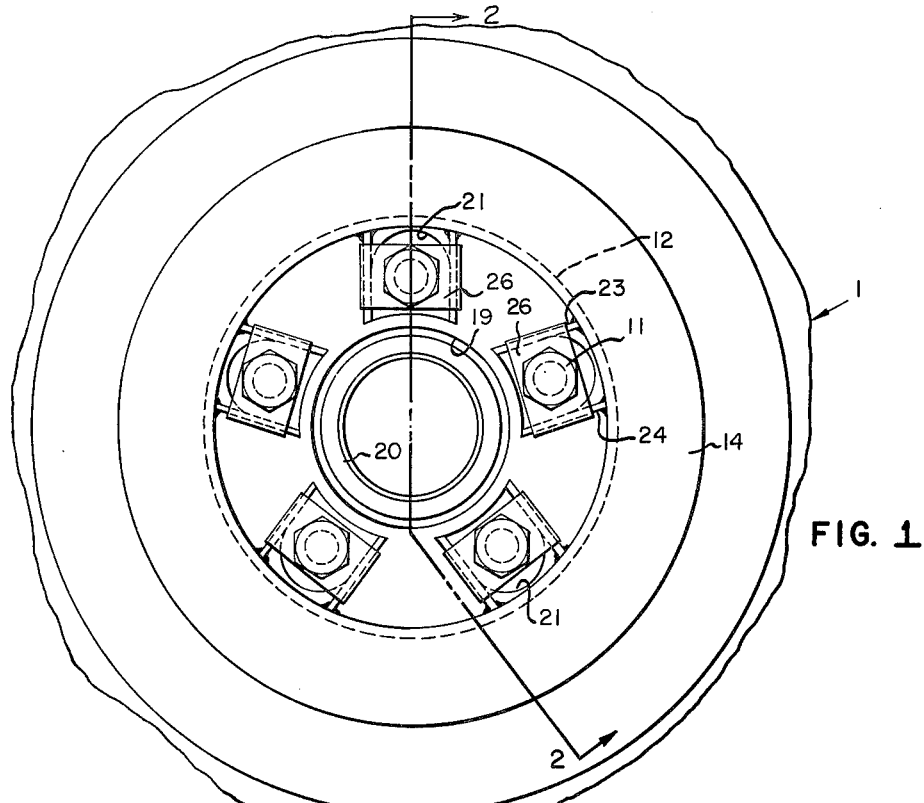
FIG. 1 is a fragmentary side elevation of the central portion of a typical vehicle wheel showing the power take-off drum installed thereon and employing the securing means which is the preferred form of the invention.
Figure 2:
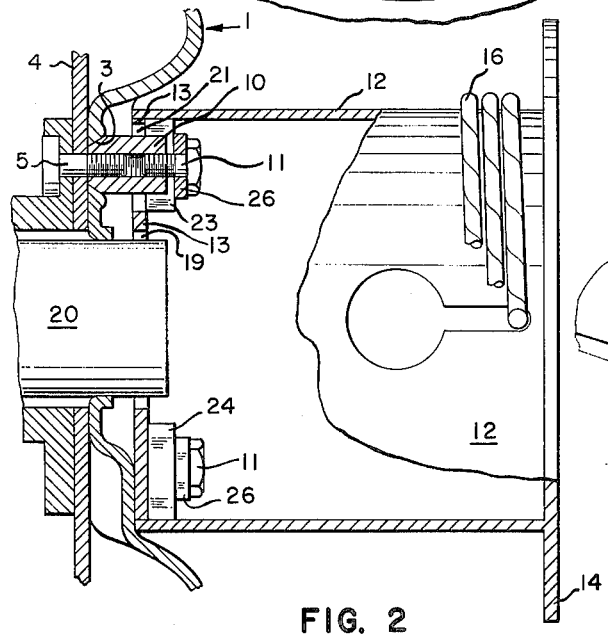
FIG. 2 is a section through the structure shown in FIG. 1 with a portion of the drum in elevation and as taken in the plane indicated by lines 2—2 of FIG. 1.

In detail, and first with reference to FIG. 1, a conventional automobile wheel is generally indicated at 1 and said wheel includes the customary row of holes 3 (FIG. 2) which are normally provided with frustoconical peripheries formed complementarily to the ends of the conventional securing nuts which ordinarily secure the wheel to the axle. With reference to FIG. 2 the end of the axle is indicated at 4 and said end usually has a row of studs 5 projecting therethrough and adapted to be received within the wheel securing nuts. By the present invention the relatively short nuts which are provided with the vehicle are discarded and in their place a plurality of elongated nuts 10 are provided. Said nuts 10 are internally threaded at their outer ends to receive therein the ends of securing bolts 11 (FIG. 2).

The hoisting drum comprises a cylindrical peripheral wall 12 to which is secured an end member 13 and a reinforcing annular rim 14 at the opposite or outer end of the drum. It will be understood, especially by reference to the copending application, that rope 16 may be wound around the peripheral wall 12 for any desired purpose. Also it will be understood that a belt or any other power transmitting element may cooperate with the drum.

The end member 13 is provided with a relatively large central aperture 19 for receiving therethrough the end of the drive shaft 20 or whatever other structure is present in the particular automobile to which the drum is to be secured. At spaced points around the end member 13 the same is provided with radially elongated slots 21 the main purpose of which is to permit the nuts 10 to extend therethrough so that the outer side of the end member 13 may be abutted against the outer side of the wheel 1. In the form shown in FIG. 3 a pair of spacer plates 23, 24 are integrally secured as by welding to the end member 13 and the peripheral wall 12. The function of plates 23, 24 is to provide a spacing means that permits the nut 10 to be received within the interior of the drum so that a tightening torque may be applied to bolt 11 for securing the drum in place. To this end a general rectangular washer plate 26 is also provided extending across the inner ends 27, 28 of spacer plates 23, 24. It will be noted at this point that with the washer 26 in the position shown in FIG. 3 the bolt 11 may be tightened so as to urge the drum against the wheel 1 (FIG. 2).

Figure 3:
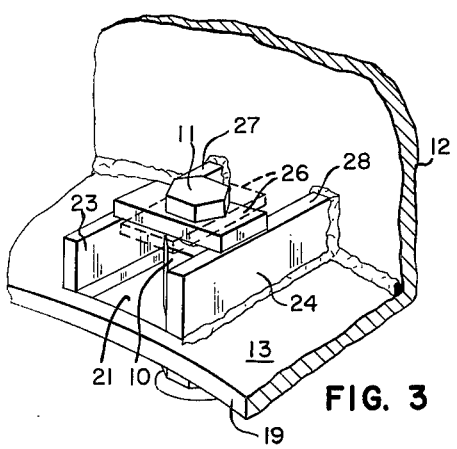
FIG. 3 is a fragmentary perspective showing the interior of the attaching end of the drum cooperating with the securing means. In this view the wheel is positioned horizontally for clarity.
Figure 7:
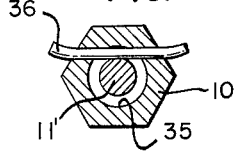
FIG. 7 is a cross section of the nut of FIG. 6 as taken in a plane indicated by lines 7—7 of FIG. 6.

The openings 21 in end member 13 are elongated radially of the drum and are slightly longer than the washer plates 26 so as to receive said plates therethrough when the washer plates 26 are turned from the position shown in full lines in FIG. 3 to the dotted line position 90° therefrom. By this structure it will be apparent that the bolt 11 and the washer plate 26 may remain on the wheel 1 at all times and when it is desired to install the power take-off drum it is merely necessary to apply the drum so that the washers 26 are received through openings 21 and, by backing off bolts 11 it is then possible to rotate the washers 26 to the full line position shown in FIG. 3 so that the bolts 11 may be tightened on said washers. As pointed out in the copending application, the presence of bolts 11 does not ordinarily present an interference with the customary decorative plate (not shown) which is usually employed to cover the end of the axle portion of the wheel.

Figure 4:
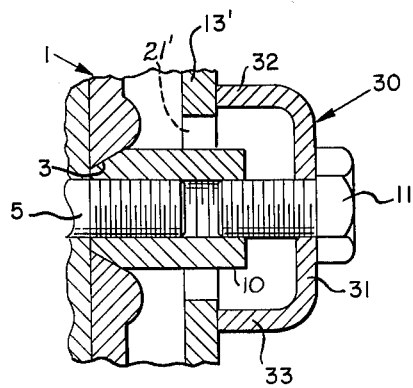
FIG. 4 is a cross section through a modified form of spacing means for the securing bolt.
Figure 5:
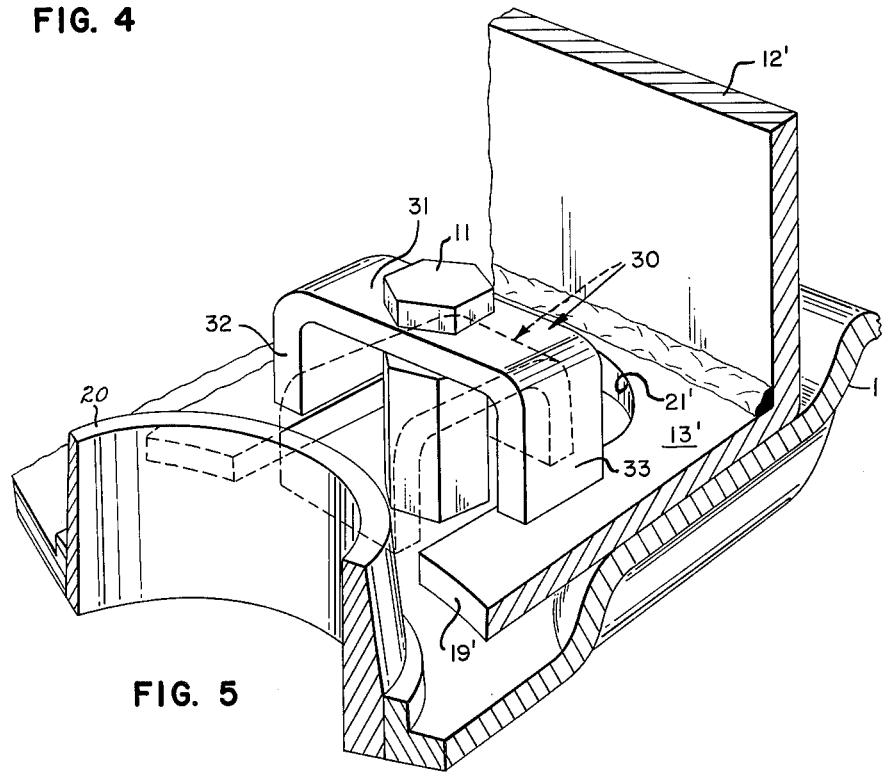
FIG. 5 is a perspective similar to FIG. 3 showing the modified form of spacer of FIG. 4.

In the modified form shown in FIGS. 4 and 5 it is not necessary to provide the fixed spacer plates 23, 24. In lieu thereof there is provided a U-shaped spacer generally designated 30 and which includes a transverse bearing element 31 and a pair of integral legs 32, 33. In this case the end member 13' of the drum is provided with an elongated slot 21' communicating with the relatively large central aperture 19' on the end member 13'. Some strength may be lost by connecting slot 21' with the central opening 19' but certain advantages of manufacture result from this procedure. Furthermore, installation and removal of the drum is facilitated.

In the structure shown in FIGS. 4 and 5 the spacer member 30 may be swung about the axis of bolt 11 to a position at right angles to that shown in full lines in FIG. 5 so that said spacer may pass through the slot 21' when the drum is being removed or installed. One advantage of this structure is that only one spacing element is employed and it is not necessary to modify the end member 13' of the drum or to affix spacing means thereto in order to achieve the object of the invention. Again, it will be noted that when the drum is not installed on the wheel the bolt 11 may be tightened so that the same projects as little as possible outwardly from the wheel and does not interfere with any decorative plate which is applied to said wheel.

Figure 6:
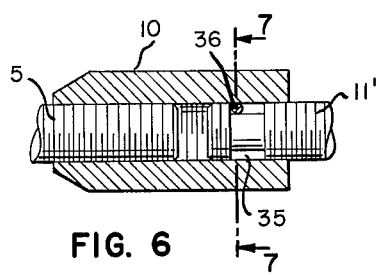
FIG. 6 is a modified form of wheel securing nut provided with means for preventing complete removal of the securing bolt.

Since it is only necessary to rotate the bolt several times one way or the other when installing or removing the drum, there is little danger that said bolt will become lost. However, it is preferable in some instances to provide a positive securement against removal of bolt 11 and such a means is shown in FIG. 6, wherein bolt 11′ is provided with an annular groove 35 of sufficient depth to accommodate a wire 36 which is passed through suitable openings in nut 10 and crimped slightly at its ends against removal. Wire 36 may, of course, be removed when it is necessary to remove the wheel. By this structure the bolt 11′ may be turned a sufficient number of times to carry out the above described procedures of installing and removing the drum without any danger of the bolt becoming completely detached and lost.

It will be apparent from the above description that the present invention provides an extremely convenient method of installing a power take-off drum to a conventional automobile or truck. Not only is it not necessary to turn the nuts 10 which secure the wheel of the automobile to the axle but it is not even necessary to remove the securing means by which the drum is affixed to the wheel. For these reasons the drum may be attached in a matter of a few minutes since it is merely necessary to remove the decorative plate, if any, back off the bolts 11 so that the spacer may be disposed in its proper position relative to the end member of the drum, and then tighten said bolts to firmly secure the drum in place.

The very specific descriptions given above of the preferred forms of the invention should not be taken as restrictive since it is apparent that various modifications in design may be resorted to by those skilled in the art without departing from the scope of the following claims.

I claim:

1. A power transmission drum adapted to be secured to the wheel of a vehicle which is provided with a circular row of holes and fastening elements received therethrough, said drum comprising:
   a generally cylindrical peripheral wall,
   a generally transversely extending end member fixed to one end of said wall and having an outer side adapted to abut said wheel,
   said end member being formed with a plurality of spaced openings in registration with said fastening elements for receiving said elements therethrough when said outer side is in abutment with said wheel,
   a bolt threadedly received in one of said fastening elements,
   a bearing element interposed between the head of said bolt and the inner side of said end member,
   said bearing element being free for turning movement about the axis of said bolt to a position in which it passes through the opening associated with said one fastening element when said drum is moved axially away from said wheel.

2. A drum according to claim 1 wherein said bearing element comprises an elongated washer and said drum includes an extension on said end extending axially inwardly of the inner side of said end member and adapted to be engaged at its inner end by said bearing element.

3. A drum according to claim 1 wherein said bearing element comprises a U-shaped spacer having a web receiving said bolt therethrough and a pair of legs fixedly secured at one of their corresponding ends to said web and adapted to engage said end member at the other of their corresponding ends.

4. A power transmission drum adapted to be secured to the wheel of a vehicle which is provided with a circular row of holes and fastening elements received therethrough, said drum comprising:
   a generally cylindrical peripheral wall,
   a generally transversely extending end member fixed to one end of said wall and having an outer side adapted to abut said wheel,
   said end member being formed with a plurality of spaced openings in registration with said fastening elements for receiving said elements therethrough when said outer side is in abutment with said wheel,
   a bolt threadedly received in one of said fastening elements,
   said end member having spacer means thereon adjacent said openings extending axially inwardly of said end member,
   an elongated bearing element interposed between the head of said bolt and the associated spacer means,
   said openings being elongated in a direction radially of said drum for receiving said bearing elements therethrough when the latter are turned in a radially extending direction, whereby said bearing elements may be turned at right angles to said direction to engage said spacer means.

5. A drum according to claim 4 wherein retaining means is provided on said fastening elements to prevent complete removal of said bolts.

References Cited by the Examiner
UNITED STATES PATENTS

| | | | |
|---|---|---|---|
| 2,642,235 | 6/1953 | Smith | 242—95 |
| 3,099,416 | 7/1963 | Wright | 242—95 |

MERVIN STEIN, *Primary Examiner.*